3,234,220
TASTELESS N-(5-NITROFURFURYLIDENE)-1-AMINOHYDANTOIN SALTS
Hans-Georg Rey, Mannheim, and Peter Rieckmann, Mannheim-Waldhof, Germany, assignors to C. F. Boehringer & Soehne Gesellschaft mit beschrankter Haftung, Mannheim-Waldhof, Germany, a corporation of Germany
No Drawing. Filed Mar. 18, 1963, Ser. No. 266,047
Claims priority, application Germany, Mar. 31, 1962, B 66,625
4 Claims. (Cl. 260—240)

The present invention relates to N-(5-nitrofurfurylidene)-1-aminohydantoin characterized by the absence of any unpleasant taste, to methods of compounding and using the same. More particularly, the invention relates to alkylamine salts of N-(5-nitrofurfurylidene)-1-aminohydantoin.

The N-(5-nitrofurfurylidene)-1-aminohydantoin is a highly effective drug which is known and distributed under the trade names "Nitrofurantoin" and "Furadantin." N-(5-nitrofurfurylidene) - 1 - aminohydantoin has proven to be of outstanding value in the treatment of virtually all urinary tract infections. This nitrofuran derivative is only slightly soluble in water, but it has a persistently bitter, and therewith unpleasant taste which is difficult to mask by flavoring agents or other devices which are used in the manufacture of oral preparations. The manufacture of a tasteless nitrofurantoin preparation is of special imporatnce in pediatrics, where for example, the use of capsules or other like dosage unit forms are not practical.

A generally practical way to improve the taste of medicaments lies in the preparation therefrom of water insoluble derivatives. These derivatives must satisfy all of the following requirements:

(1) They must be substantially completely insoluble in water, as even a very slight water solubility produces a clearly perceptible taste sensation to the tongue.

(2) The active part of the molecule must be released in the organism as completely and as rapidly as possible.

(3) The substances which are produced by decomposition of the molecule in the organism, in addition to the active substance must be biologically safe and/or readily tolerated.

It is accordingly the general object of the present invention to provide therapeutic compounds containing N-(5-nitrofurfurylidene)-1-aminohydantoin which are characterized by the absence of any unpleasant taste.

It is a further object of the present invention to provide therapeutic compositions containing the N-(5-nitrofurfurylidene)-1-aminohydantoin in the form of its alkylamine salt.

Another object of the invention is to produce compositions of alkylamine salts of N-(5-nitrofurfurylidene)-1-aminohydantoin having enhanced therapeutic effectiveness.

More specifically, it is an object of the present invention to provide therapeutic compositions for internal use and comprised of an alkylamine salt of N-(5-nitrofurfurylidene)-1-aminohydantoin.

Other objects will be apparent to those skilled in the art in view of the following disclosure.

In accordance with the invention, it has now been found that N-(5-nitrofurfurylidene)-1-aminohydantoin compositions with alkylamines having 12 to 22 carbon atoms salts fully satisfy the above requirements for a tasteless drug. The new alkylamine salts are substantially insoluble in water, and therewith, free of any taste. The active substances are rapidly released in the body and further, the salts per se as well as the salt forming compound are readily tolerated.

The preparations of the present invention are preferably prepared in micronized form in syrups, elixirs or drops. The blood and urine levels of N-(5-nitrofurfurylidene)-1-aminohydantoin obtained with the novel preparations of the invention correspond to those of the free nitrofurantoin. Another preferred dosage unit form, is a tablet containing the alkylamine-N-(5-nitrofurfurylidene)-1-aminohydantoin salts. Other dosage forms of the salt of the invention, such as granules, powders, and pills may also be employed. Of course, the dosage unit of alkylamine - N - (5-nitrofurfurylidene)-1-aminohydantoin may contain other inert materials, as for instance, various binders, fillers or solid diluents. Suitable materials for this purpose may be illustrated by starch, for instance corn starch, and sugars, for instance lactose and sucrose.

The preparation of the salts of the invention involves the reaction of N-(5-nitrofurfurylidene)-1-aminohydantoin with an alkylamine in a suitable organic solvent. Solvents which are satisfactory for dissolving nitrofurantoin include, for example, the lower alcohols, dimethyl formamide, and dimethyl sulfoxide. Instances of solvents particularly useful for dissolving the alkylamines are the lower alcohols, acetone, carbon tetrachloride, chloroform and methylene chloride. The individual compounds can be dissolved in the same or in different solvents, and then combined, whereupon an increase in temperature occurs. Following cooling, the salts formed crystallize out of the solution. The reaction to form the salts, however, can also be carried out by intimately and finely grinding the nitrofuran compound and the alkylamine and thereafter suspending the finely ground product in a solvent. Following stirring of the reaction mixture for a prolonged period, a complete conversion takes place, with the formation of the desired salt. It is also possible, however, to convert water soluble salts of N-(5-nitrofurfurylidene)-1-aminohydantoin (the alkali salts, for example) with higher chlorides or another like water soluble salt of the alkylamine.

The invention is illustrated by the following examples, but it is to be understood that they are presented only for the purpose of illustration, and not as indicating limits of the invention.

*Example 1*

4.76 grams of N-(5-nitrofurfurylidene)-1-aminohydantoin are dissolved in 50 ml. of dimethylsulfoxide and the resulting solution mixed with a solution of 5.39 grams of stearylamine in 200 ml. of chloroform. A temperature rise is observed. After cooling in a refrigerator, orange-colored crystals form in acicular clusters. The crystals are recrystallized out of methanol. The resulting crystals are entirely tasteless and have a M.P. of 133–135° C. with decomposition.

*Analysis.*—Calculated: C, 61.5%; H, 8.9%; N, 13.8%. Actual: C, 61.0%; H, 8.6%; N, 14.1%.

The stoichiometrically computed content of N-(5-nitrofurfurylidene)-1-aminohydantoin in the salt amounts to 46.9%. The actual content determined by ultraviolet absorption at 367 m$\mu$ is 46.9%.

*Example 2*

47.6 grams of N-(5-nitrofurfurylidene)-1-aminohydantoin and 53.9 grams of stearylamine are finely ground together, thereafter the mixture is suspended in 600 ml. of methanol and stirred for several hours. The resultant crystals are recrystallized out of methanol and have the same properties as the product described in Example 1.

Example 3

4.76 grams of N-(5-nitrofurfurylidene)-1-aminohydantoin and 4.83 grams of cetylamine are finely ground together. The mixture suspended in 200 ml. of methanol and allowed to stand overnight. The orange-colored crystals that form are recrystallized out of methanol and are characterized by a M.P. of 117–119° C. (decomp.).

*Analysis.*—Calculated: C, 60.1%; H, 8.6%; N, 14.6%. Actual: C, 60.4%; H, 8.7%; N, 14.5%.

The stoichiometrically computed content of N-(5-nitrofurfurylidene)-1-aminohydantoin in the salt amounts to 49.66%, the actual content determined by ultraviolet absorption is 46.9%.

Example 4

4.76 grams of N-(5-nitrofurfurylidene)-1-aminohydantoin and 3.71 grams of laurylamine are finely ground and thereafter suspended in 80 ml. of methanol. The suspension is stored for 2 days with occasional shaking. The yellowish suspension turns reddish brown. The copper-colored crystals that form are recrystallized out of methanol and have a M.P. of 128° C. (decomp.). The above examples show that the reactants are employed in equimolecular amounts. However, it is also possible for one or the other to be present in a slight excess.

Tasteless nitrofurantoin drops in accordance with the invention may be for instance prepared from the following types and amounts of materials.

| | |
|---|---|
| Nitrofurantoin stearyamine salt _____mg__ | 534.5 |
| Cremophore L10 [1] _____mg__ | 60 |
| Oxynex 2004 [2] _____mg__ | 3 |
| Titriplex III [3] _____mg__ | 100 |
| Sorbitol (70% aqueous solution) _____ml__ | 5.5 |
| Silicone emulsion _____mg__ | 0.15 |
| Vanillin _____mg__ | 1.5 |
| Aqua dest. ad 10 ml. | |

[1] Emulgator consisting of hydrophilic fatty acid esters.
[2] Antioxydans consisting of 2,6-ditert. butyl-4-methyl phenol.
[3] Chelating agent consisting of disodium ethylenediaminetetraacetate.

The ingredients are mixed in conventional manner to yield 10 ml. of pleasant tasting nitrofurantoin drops, 1 ml. containing 25 mg. nitrofurantoin (i.e. 53.45 mg. of the stearylamine salt). The average daily dosage is 5 mg./kg. body weight, that is, a child of 20 kg. has to take 4 times 1 ml. of the above described nitrofurantoin drops.

We claim:

1. A tastefree alkylamine salt of N-(5-nitrofurfurylidene)-1-aminohydantoin, wherein the alkylamine contains 12–22 carbon atoms.
2. A tastefree stearylamine salt of N-(5-nitrofurfurylidene)-1-aminohydantoin.
3. A tastefree cetylamine salt of N-(5-nitrofurfurylidene)-1-aminohydantoin.
4. A tastefree laurylamine salt of N-(5-nitrofurfurylidene)-1-aminohydantoin.

References Cited by the Examiner

UNITED STATES PATENTS

| | | | |
|---|---|---|---|
| 2,460,747 | 2/1949 | Henze | 260—309.5 |
| 3,124,507 | 3/1964 | Reisner et al. | 167—58 |
| 3,154,543 | 10/1964 | Ebetino et al. | 260—240 |

FOREIGN PATENTS

| | | |
|---|---|---|
| 788,373 | 1/1958 | Great Britain. |
| 865,796 | 4/1961 | Great Britain. |
| 346,549 | 7/1960 | Switzerland. |

OTHER REFERENCES

Chemical Abstracts, vol. 44, col. 9631 (1950) [abstract of Hamilton et al., J. Am. Pharm. Assoc., vol 39, pages 378–82 (1950)].

German Auslegeschrift 1,086,233, Aug. 4, 1960, 3 pages specification.

WALTER A. MODANCE, *Primary Examiner.*

JOHN D. RANDOLPH, *Examiner.*